and Hinds

United States Patent [19]
Kirby

[11] 4,168,945
[45] Sep. 25, 1979

[54] EXPLOSION PROOF BED FOR CATALYST COMBUSTION HEATER

[76] Inventor: Alan C. Kirby, 10402 - 161 St., Edmonton, Alberta, Canada

[21] Appl. No.: 870,997

[22] Filed: Jan. 20, 1978

[30] Foreign Application Priority Data

Jun. 21, 1977 [CA] Canada .................................. 281072

[51] Int. Cl.² ...................... F23D 19/00; B01J 23/42; B01J 23/44
[52] U.S. Cl. .................................. 431/7; 252/455 R; 252/466 B; 252/472; 252/477 R
[58] Field of Search ............... 252/455 R, 466 B, 472, 252/477 R; 431/7

[56] References Cited

U.S. PATENT DOCUMENTS

| | | | |
|---|---|---|---|
| 3,867,309 | 2/1975 | Oleck et al. | 252/466 B |
| 3,881,696 | 5/1975 | Lepeytre et al. | 252/466 B |
| 4,029,602 | 6/1977 | Risse | 252/477 R |

*Primary Examiner*—W. J. Shine
*Attorney, Agent, or Firm*—Larson, Taylor and Hinds

[57] ABSTRACT

The incorporation into a catalyst bed for a catalytic combustion heater including carrier material and a platinum and/or palladium catalyst, of iron oxide in amounts sufficient to render the bed explosion-proof when operated in explosive and inflammable atmospheres. The ratio by weight of the iron oxide to the catalyst is at least 7:1 to provide a stable explosion-proof catalyst bed.

16 Claims, No Drawings

EXPLOSION PROOF BED FOR CATALYST COMBUSTION HEATER

BACKGROUND OF THE INVENTION

The present invention relates to an explosion-proof catalyst bed for use in catalytic combustion heaters, and to a method for rendering explosion-proof a catalytic heater bed which would otherwise be subject to explosion.

Explosion proof catalytic combustion heaters have been produced in North America since the early 1960's. These heaters use platinum and palladium in various quantities as the active combustion catalyst and these catalysts are impregnated into asbestos carrier material to form a catalyst bed. Catalytic combustion takes place within the catalyst bed when a hydrocarbon fuel such as propane or natural gas mixed with oxygen from the surrounding atmosphere is heated to approximately 250° F. with an electrical element incorporated into the heater. Once the reaction starts, it is self-sustaining until the fuel supply is cut off.

Catalyst beds for these combustion heaters have in the past been made utilizing a special amphibole asbestos carrier material which has served to render the bed explosion-proof when operating in potentially explosive atmospheres.

This amphibole asbestos material is no longer available in suitable form to produce a good quality catalyst bed, and catalyst beds using asbestos material other than this amphibole asbestos or other suitable carrier material are susceptible to explosion when used in areas containing flammable gases and this severely limits the extent of the use of catalytic combustion heaters.

SUMMARY OF THE INVENTION

The present invention is based on the surprising discovery that a platinum and/or palladium catalyst can be impregnated into almost any material suitable as a catalyst carrier for a catalytic combustion heater, and provide an explosion-proof catalytic combustion bed for a catalytic heater, if iron oxide is added either to the catalyst, or to the carrier in sufficient quantities. The quantities of iron oxide required to convert a non-explosion proof catalyst bed into an explosion-proof catalyst bed, will vary depending on the form of the catalyst metal, or combination of catalyst metals selected, the form or type of carrier selected, and the method of incorporating these metals into the catalyst, but generally it has been found that the ratio by weight of iron oxide to the platinum and/or palladium metal catalyst must be at least 7:1 to provide a stable explosion-proof catalyst bed.

The principal object of the present invention is to provide a catalyst bed for a catalytic combustion heater including a platinum and/or palladium metal catalyst, which allows the use of any suitable man-made fiber or natural fiber and which is explosion-proof.

This object is achieved by the inclusion in a catalyst bed formed of suitable carrier material impregnated with platinum and/or palladium metal catalyst, of iron oxide in quantities sufficient to render the catalyst bed explosion-proof when used in locations where the atmosphere surrounding contains flammable gases or vapors present in such quantities to produce ignitable or explosive mixtures.

An explosion proof catalyst bed is one that will operate at temperatures in excess of published self-ignition temperatures of various mixtures of gases or vapors surrounding the catalytic heater without causing an ignition of these gases or vapors.

The catalyst bed according to the present invention when used within a suitable catalytic combustion heater will operate in atmospheres containing hazardous concentrations of flammable gases of vapors in quantities sufficient to produce explosive or ignitable mixtures of the following materials without causing an explosion or ignition. Such atmospheres are:

1. Atmospheres containing acetylene,
2. Atmospheres containing ethyl-ether vapors, ethylene, cyclopropane, or other gases or vapors of equivalent hazard,
3. Atmospheres containing gasoline, hexane, naphtha, benzene, butane, propane, alcohol, acetone, benzole, lacquer-solvent vapors, natural gas, or other gases or vapors of equivalent hazard.

According to the invention platinum and/or palladium metal catalysts can be applied to any fibrous material suitable as a catalyst carrier for a catalytic combustion heater, and still produce an explosion-proof catalyst bed, providing sufficient quantities of iron oxide are added to the catalyst bed.

The quantity of iron oxide required to convert a non-explosion-proof catalyst bed to an explosion-proof catalyst bed can vary to some extent depending on the method of application and the type of carrier selected, but as discussed above, the ratio by weight of iron oxide to the platinum group metal catalyst must be at least 7:1 to provide a stable explosion-proof catalyst bed.

The iron oxide can be incorporated into the carrier bed material during the manufacture of the carrier or can be coded by mechanical or chemical means to any suitable natural or manufactured catalyst carrier material. Alternatively, the iron oxide can be mixed with the catalyst metal prior to incorporation into the carrier material or be incorporated into the carrier separately from the catalyst metal.

Applicant has prepared explosion proof catalyst beds using ceramic fibers of alumina, alumina-silica and asbestos fibers, other than amphibole asbestos, and which incorporate suitable quantities of iron oxide, and other suitable synthetic or natural materials are within the scope of the invention.

For determining the potentially explosive nature of a catalyst bed applicant positioned an acetylene air induction torch approximately ½" away from and directed at the catalyst bed. The heater containing the catalyst bed was then started and the acetylene air induction torch was turned on.

Acetylene was chosen as the test gas because of its low self ignition temperatures over a wide percentage of air acetylene mixtures.

The following examples are by way of clarification only, and are not intended to limit the scope of the invention.

EXAMPLE 1

An aqueous preparation of platinum, palladium, and iron oxide was ground and the preparation filtered through alumina-silica fibers to form a uniform mixture. The fibers were then formed to produce a catalyst bed 8"×8"×½" thick. The catalyst bed was then dried and mounted in a suitable catalytic heater.

platinum: 0.0083 oz.
palladium: 0.0167 oz.

iron oxide: 0.389 oz.
alumina-silica fibers: 2.670 oz.

The catalyst bed was tested and proved to be explosion-proof.

EXAMPLE 2

A similar preparation to Example 1 was used, except the iron oxide content was reduced to 0.190 oz.

The catalyst bed was tested and proved to be explosion-proof.

EXAMPLE 3

A similar preparation to Example 1 was used except the iron oxide content was increased to the maximum amount that could be retained within the carrier.

The catalyst bed was tested and proved to be explosion-proof.

EXAMPLE 4

Similar preparations to Example 1 were produced using two types of alumina-silica oxide fibers as well as one type of alumina fiber, and quality asbestos. In each case, the catalyst bed produced was explosion-proof.

EXAMPLE 5

Similar preparations to Examples 1, 2, 3 and 4 were produced except the iron oxide was eliminated. In each case the catalyst bed produced was not explosion proof.

Further modifications and alternative embodiments of the invention will be apparent to those skilled in the art in view of the description. Accordingly, the description is to be construed as illustrative only and is for the purpose of teaching those skilled in the art, the manner of carrying out the invention.

What is claimed is:

1. In a catalyst bed for a catalytic heater for the production of useful heat by catalytic combustion of a gaseous fuel, the bed comprising a porous carrier including a catalyst capable of supporting catalytic combustion of a gaseous fuel when incorporated as part of a catalytic combustion heater connected to a supply of the gaseous fuel, the improvement wherein said catalyst bed includes an added amount of iron oxide sufficient to render the catalyst bed explosion-proof during catalytic combustion of the gaseous fuel in a catalytic combustion heater.

2. A catalyst bed for a catalytic heater as claimed in claim 1 wherein said catalyst includes platinum and/or palladium.

3. A catalyst bed for a catalytic heater as claimed in claim 2 wherein the ratio by weight of iron oxide to the platinum and/or palladium catalyst is at least 7 to 1.

4. A catalyst bed for a catalytic heater as claimed in claim 2 wherein the ratio by weight of iron oxide to the weight of catalyst bed is at least about 1 to 15.

5. A catalyst bed for a catalytic heater as claimed in claim 1 wherein said carrier is fibrous.

6. An explosion-proof catalytic combustion heater comprising a catalyst bed as claimed in claim 1 adapted for connection with a supply of gaseous fuel.

7. An explosion-proof catalytic combustion heater comprising a catalyst bed as claimed in claim 2 adapted for connection with a supply of gaseous fuel.

8. A method of avoiding explosion during operation of a catalytic combustion heater, comprising incorporating in the heater a catalyst bed as claimed in claim 1.

9. A method of avoiding explosion during the operation of a catalytic combustion heater, comprising incorporating in the heater a catalyst bed as claimed in claim 2.

10. In a method of preparing a catalyst bed for use in a catalytic combustion heater by incorporating in a carrier a catalyst capable of supporting catalytic combustion of a gaseous fuel, the improvement comprising incorporating in the carrier also an added amount of iron oxide sufficient to render the catalyst bed explosion-proof during catalytic combustion of a gaseous fuel in a catalytic combustion heater.

11. A method as claimed in claim 10 wherein the catalyst comprises platinum and/or palladium.

12. A method of making an explosion-proof catalytic combustion heater comprising preparing a catalyst bed as claimed in claim 11, and incorporating the bed in a catalytic combustion heater adapted for connection with a supply of gaseous fuel.

13. A method as claimed in claim 11 wherein fine particles of platinum and/or palladium and iron oxide are formed into a mixture and deposited on the carrier.

14. A method as claimed in claim 11 wherein the carrier comprises fibers of alumina-silica or alumina.

15. A method as claimed in claim 11 wherein the ratio by weight of the iron oxide to the platinum and/or palladium catalyst is at least 7 to 1.

16. A method as claimed in claim 11 wherein the ratio by weight of iron oxide to weight of catalyst bed is at least about 1 to 15.

* * * * *